(12) United States Patent
Blaszczyk et al.

(10) Patent No.: US 7,309,537 B2
(45) Date of Patent: Dec. 18, 2007

(54) FUEL CELL SYSTEM WITH FLUID STREAM RECIRCULATION

(75) Inventors: Janusz Blaszczyk, Richmond (CA);
Rainer Schmidt, Burnaby (CA);
Wolfram Fleck, Coquitlam (CA); Paul L. Paterson, Vancouver (CA)

(73) Assignee: Ballard Power Systems Inc., Burnaby, British Columbia (CA)

( * ) Notice: Subject to any disclaimer, the term of this patent is extended or adjusted under 35 U.S.C. 154(b) by 652 days.

(21) Appl. No.: 10/666,919

(22) Filed: Sep. 18, 2003

(65) Prior Publication Data
US 2005/0064255 A1    Mar. 24, 2005

(51) Int. Cl.
*H01M 8/04* (2006.01)
(52) U.S. Cl. .............................. 429/17; 429/22; 429/24
(58) Field of Classification Search ...................... None
See application file for complete search history.

(56) References Cited

U.S. PATENT DOCUMENTS

| | | | |
|---|---|---|---|
| 3,462,308 A | 8/1969 | Winters ....................... | 136/36 |
| 3,982,961 A | 9/1976 | Grasso ........................ | 429/34 |
| 4,769,297 A | 9/1988 | Reiser et al. ................. | 429/17 |
| 5,082,752 A | 1/1992 | Koga et al. ................... | 429/20 |
| 5,169,730 A | 12/1992 | Reichner et al. .............. | 429/20 |
| 5,441,821 A | 8/1995 | Merritt et al. ................ | 429/17 |
| 6,013,385 A | 1/2000 | DuBose ........................ | 429/17 |
| 2002/0022171 A1 | 2/2002 | Saito et al. ................... | 429/34 |
| 2002/0022172 A1 | 2/2002 | Sahoda et al. ................. | 429/34 |
| 2002/0041985 A1 | 4/2002 | Shimanuki et al. ........... | 429/17 |
| 2002/0136942 A1 | 9/2002 | Kashiwagi .................... | 429/34 |
| 2003/0008185 A1 | 1/2003 | Sugino et al. ................. | 429/13 |
| 2003/0012989 A1 | 1/2003 | Ueda et al. .................... | 429/22 |
| 2003/0096145 A1 | 5/2003 | Sugawara et al. ............. | 429/22 |
| 2003/0148167 A1 | 8/2003 | Sugawara et al. ............. | 429/34 |
| 2003/0180599 A1 | 9/2003 | Kamihara ..................... | 429/34 |

FOREIGN PATENT DOCUMENTS

| | | |
|---|---|---|
| GB | 1 471 324 | 4/1977 |
| JP | 2001-266922 | 9/2001 |
| WO | WO 03/043114 A2 | 5/2003 |
| WO | WO 2004/038838 A2 | 5/2004 |

*Primary Examiner*—Jonathan Crepeau
(74) *Attorney, Agent, or Firm*—Seed IP Law Group PLLC

(57) ABSTRACT

An apparatus for recirculating a reactant fluid stream of a fuel cell system, and electric power generation systems comprising the apparatus, are disclosed. The apparatus comprises (1) a common suction chamber fluidly connected to a suction inlet configured to receive a recirculated flow from the exhaust stream of the fuel cell stack, (2) a low-flow nozzle positioned in the common suction chamber and fluidly connected to a low-flow motive inlet configured to receive a first motive flow from a reactant source of the fuel cell stack, (3) a low-flow diffuser fluidly connected to a discharge outlet configured to provide the inlet stream to the fuel cell stack, (4) a high-flow nozzle positioned in the common suction chamber and fluidly connected to a high-flow motive inlet configured to receive the first motive flow from the reactant source, and (5) a high-flow diffuser fluidly connected to the discharge outlet.

23 Claims, 8 Drawing Sheets

FUEL CELL SYSTEM WITH FLUID STREAM RECIRCULATION

BACKGROUND OF THE INVENTION

1. Field of the Invention

The present invention generally relates to fuel cell systems and, more particularly, to fuel cell systems with recirculation of a fluid stream.

2. Description of the Related Art

Electrochemical fuel cell assemblies convert reactants, namely fuel and oxidant, to generate electric power and reaction products. Electrochemical fuel cell assemblies generally employ an electrolyte disposed between two electrodes, namely a cathode and an anode. The electrodes generally each comprise a porous, electrically conductive sheet material and an electrocatalyst disposed at the interface between the electrolyte and the electrode layers to induce the desired electrochemical reactions. The location of the electrocatalyst generally defines the electrochemically active area.

Solid polymer fuel cell assemblies typically employ a membrane electrode assembly ("MEA") consisting of a solid polymer electrolyte, or ion exchange membrane, disposed between two electrode layers. The membrane, in addition to being an ion conductive (typically proton conductive) material, also acts as a barrier for isolating the reactant (i.e., fuel and oxidant) streams from each other.

The MEA is typically interposed between two separator plates, which are substantially impermeable to the reactant fluid streams, to form a fuel cell assembly. The plates act as current collectors, provide support for the adjacent electrodes, and typically contain flow field channels for supplying reactants to the MEA or for circulating coolant. The plates are typically known as flow field plates. The fuel cell assembly is typically compressed to ensure good electrical contact between the plates and the electrodes, as well as good sealing between fuel cell components. A plurality of fuel cell assemblies may be combined electrically, in series or in parallel, to form a fuel cell stack. In a fuel cell stack, a plate may be shared between two adjacent fuel cell assemblies, in which case the plate also separates the fluid streams of the two adjacent fuel cell assemblies. Such plates are commonly referred to as bipolar plates and may have flow channels for directing fuel and oxidant, or a reactant and coolant, on each major surface, respectively.

The fuel stream that is supplied to the anode typically comprises hydrogen. For example, the fuel stream may be a gas such as substantially pure hydrogen or a reformate stream containing hydrogen. The oxidant stream, which is supplied to the cathode, typically comprises oxygen, such as substantially pure oxygen, or a dilute oxygen stream such as air.

Each of the fuel cells making up a stack is typically flooded with the selected fuel and oxidant at a desired pressure. In certain systems, the desired pressure is kept constant regardless of load demand, while in other systems the desired pressure varies according to load demand. In all systems however, the desired pressure is generally controlled by a regulator at the source of the reactant. Such regulators can take many forms. For example, where the reactant originates from a source where gas pressure is higher than the desired pressure, the regulator can take the form of a variable opening valve system, which lets in as little or as much flow as necessary to maintain/attain the desired pressure: such regulators are typically called pressure regulators. In another example, where the reactant originates from a source where gas pressure is lower than the desired pressure, the regulator can take the form of a compressor. In yet another example, where the reactant originates from a source where gas pressure is substantially the same as the desired pressure, the regulator can take the form of a blower. More than one form of regulator can exist in a system. For example, Merritt et al., U.S. Pat. No. 5,441,821 discloses a system where the fuel originates from a high pressure source (pressurized hydrogen) and is controlled by a pressure regulator before reaching the stack, while the oxidant originates from a low pressure source (the environment) and is controlled by an air compressor (i.e., the air is compressed before reaching the stack).

Pressure regulators operate on a differential basis as the desired pressure is always set in relation to another pressure, which can be constant (e.g., maintain/attain a desired pressure over atmospheric pressure) or variable (e.g., maintain/attain a desired pressure over the pressure in some other part of the system, such other pressure being variable). For example, in the system disclosed by Merritt et al., U.S. Pat. No. 5,441,821, the compressor sets the desired oxidant pressure in relation to a constant pressure (atmospheric pressure), while the valve-type pressure regulator sets the desired fuel stream pressure according to a variable pressure, more specifically to maintain/attain a desired steady-state pressure differential between the fuel and oxidant streams.

Each reactant stream exiting the fuel cell stack generally contains useful reactant products, such as water and unconsumed fuel or oxidant, which can be made use of by the fuel cell system. On way to make use of such useful reactant products is to recirculate the exhaust reactant streams. Therefore, for example, recirculating the hydrogen exhaust stream to the anode inlet leads to a more efficient system as it minimizes waste that would result from venting the unconsumed hydrogen to the atmosphere.

As outlined in Merritt et al., U.S. Pat. No. 5,441,821, one way to effect hydrogen recirculation is through the use of a jet ejector, where the ejector's motive inlet is fluidly connected to the pressurized hydrogen supply, the ejector's suction inlet is fluidly connected to the hydrogen exhaust outlet and the ejector's discharge outlet is fluidly connected to the fuel cell stack's hydrogen stream inlet. As a result, according to the well known operation of jet ejectors, the hydrogen supply stream entrains (and therefore recirculates) the relatively low pressure hydrogen exhaust stream, with the two streams mixing before entering the fuel cell stack's anode inlet.

In light of the wide spectrum of fuel cell stack hydrogen inlet stream flow rates over which the jet ejector must operate, it has proven difficult to design a satisfactory jet ejector. Designing a jet ejector to supply the needed inlet flow rate to the fuel cell stack during maximum-load demand periods results in the nozzle and/or the throat portion of the diffuser being too large to recirculate the needed hydrogen during low-load demand periods (e.g., idle periods). Conversely, designing a jet ejector to recirculate the needed hydrogen during low-load demand periods results in the nozzle and/or the throat portion of the diffuser being too small to supply the needed inlet flow rate to the fuel cell stack during maximum-load demand periods.

To address the foregoing problem, a two-stage changeover ejector system has been proposed by Tatsuya et al., Japan Publ. No. 2001-266922, where one of either a low-flow or high-flow ejector is used depending on the conditions prevailing at the time. However, having two separate ejectors and the related fluid circuitry leads to space requirement concerns in typical automotive applications.

Furthermore, the transition point in such systems, more specifically when the motive flow course is changed from the low-flow to the high-flow ejector, typically experiences a sudden drop in recirculation that often falls below the needed minimum entrainement level. Adding further ejectors would alleviate the transition point concern but, in turn, would aggravate the space requirement concerns.

There is therefore a need for a fuel cell system, with recirculation of a fluid stream, that can operate efficiently over the whole range of a fuel cell stack's operating conditions and that addresses some of the space requirement concerns typical in vehicular applications. The present invention addresses these and other needs, and provides further related advantages.

BRIEF SUMMARY OF THE INVENTION

The invention provides an apparatus for recirculating a reactant fluid stream of a fuel cell system having a fuel cell stack with an inlet stream and an exhaust stream. The apparatus comprises:
  a common suction chamber fluidly connected to a suction inlet configured to receive a recirculated flow from the exhaust stream of the fuel cell stack; the common suction chamber may be substantially cylindrical;
  a low-flow nozzle positioned in the common suction chamber and fluidly connected to a low-flow motive inlet configured to receive a first motive flow from a reactant source of the fuel cell stack;
  a low-flow diffuser fluidly connected to a discharge outlet configured to provide the inlet stream to the fuel cell stack;
  a high-flow nozzle positioned in the common suction chamber and fluidly connected to a high-flow motive inlet configured to receive the first motive flow from the reactant source; and
  a high-flow diffuser fluidly connected to the discharge outlet.

The low-flow nozzle and diffuser may be configured to entrain the recirculated flow and provide the inlet stream at low-load conditions, while the high-flow nozzle and diffuser may be configured to entrain the recirculated flow and provide the inlet stream at high-load conditions.

The apparatus may further comprise:
  an ultra-low-flow nozzle positioned in the common suction chamber and fluidly connected to an ultra-low-flow motive inlet configured to receive a second motive flow from the reactant source; and
  an ultra-low-flow diffuser fluidly connected to the discharge outlet.

The ultra-low-flow nozzle and diffuser may be configured to entrain a portion of the recirculated flow and provide a portion of the inlet stream at idle-load conditions.

The apparatus may further comprise one-way check valves for preventing flow regress through each diffuser.

The invention also provides an electric power generation system. The system comprises:
  a fuel cell stack comprising a reactant stream inlet, a reactant stream outlet and at least one fuel cell;
  a pressurized reactant supply;
  a multiple ejector assembly, comprising:
    i) a first motive flow inlet fluidly connected to the pressurized reactant supply,
    ii) a second motive flow inlet fluidly connected to the pressurized reactant supply,
    iii) a suction inlet, fluidly connected to the reactant stream outlet to receive a recirculated flow from the fuel cell stack, and
    iv) a discharge outlet, fluidly connected to the reactant stream inlet to provide an inlet stream to fuel cell stack;
  a regulator, fluidly connected to, and interposed between, the pressurized reactant supply and the first and second motive flow inlets of the multiple jet ejector assembly, for regulating a first motive flow to the multiple jet ejector assembly; the regulator may be a pressure control valve; and
  a first solenoid valve, fluidly connected to, and interposed between, the second motive flow inlet and the regulator.

The electric power generation system provided by the invention may further comprise:
  a second solenoid valve, fluidly connected to, and interposed between, the second motive flow inlet and the regulator;
  a by-pass line, fluidly connecting the pressurized reactant supply to the second motive flow inlet, for supplying a second motive flow to the multiple jet ejector assembly; and
  a by-pass solenoid valve, fluidly connected to, and interposed in the bypass line between, the pressurized reactant supply and the second motive flow inlet.

The first motive flow inlet may be fluidly connected to a first nozzle and diffuser configured to entrain the recirculated flow and provide the inlet stream at high-load conditions, while the second motive flow inlet may be fluidly connected to a second nozzle and diffuser configured to entrain the recirculated flow and provide the inlet stream at low-load conditions.

The electric power generation system may further comprise a pressure transducer for detecting the pressure of the first motive flow to the multiple jet ejector assembly and for assisting in the operation of the first, second and by-pass solenoid valves.

The invention also provides a method of operating such electric power generation system, wherein:
  during low-load operating conditions, the second solenoid valve is opened and the first and by-pass solenoid valves are closed, so that the first motive flow is directed to the second motive flow inlet; and
  during high-load operating conditions, the second solenoid valve is closed and the first and by-pass solenoid valves are opened, so that the first motive flow is directed to the first motive flow inlet and the second motive flow is directed to the second motive flow inlet.

The multiple jet ejector assembly of the electric power generation system may further comprise a third motive flow inlet fluidly connected to the pressurized reactant supply. The third motive flow inlet may fluidly be connected to a third nozzle and diffuser configured to entrain a portion of the recirculated flow and provide a portion of the inlet stream at idle-load conditions.

The method of operating such electric power generation system provided by the invention comprises:
  during all operating conditions, directing a third motive flow from the pressurized reactant supply to the third motive flow inlet.

The invention also provides an electric power generation system comprising:
  a fuel cell stack, comprising a first reactant stream inlet configured to receive a first inlet stream, a second reactant stream inlet configured to receive a second inlet stream, a first reactant stream outlet and at least one fuel cell;

a pressurized reactant supply;

a multiple jet ejector assembly, comprising:
  i) a suction inlet, fluidly connected to the first reactant stream outlet to receive a recirculated flow,
  ii) a discharge outlet, fluidly connected to the first reactant stream inlet to provide the first inlet stream,
  iii) a first motive flow inlet fluidly connected to the pressurized reactant supply, and
  iv) a second motive flow inlet fluidly connected to the pressurized reactant supply;

a first pressure regulator, fluidly connected to, and interposed between, the pressurized reactant supply and the first motive flow inlet, for regulating the pressure of a first motive flow to the first motive flow inlet, wherein the first pressure regulator is configured to maintain the pressure of the first inlet stream, in relation to the pressure of the second inlet stream, at a substantially constant first pressure differential; and a second pressure regulator, fluidly connected to, and interposed between, the pressurized reactant supply and the second motive flow inlet, for regulating the pressure of a second motive flow to the second motive flow inlet, wherein the second pressure regulator is configured to maintain the pressure of the first inlet stream, in relation to the pressure of the second inlet stream, at a substantially constant second pressure differential, the second pressure differential being different from the first pressure differential.

The first motive flow inlet may be fluidly connected to a first nozzle and diffuser configured to entrain the recirculated flow and provide the inlet stream at high-load conditions and the second motive flow inlet may be fluidly connected to a second nozzle and diffuser configured to entrain the recirculated flow and provide the inlet stream at low-load conditions, the first pressure differential being less than the second pressure differential.

The invention also provides a pressure regulator, comprising:
  a first reference chamber, configured to be fluidly connected to a reference feedback line of a first fluid;
  a second reference chamber, configured to be fluidly connected to a reference feedback line of a second fluid;
  a flexible membrane, fluidly separating the first and second reference chambers, biased to be in a state of equilibrium whenever the pressure of the first fluid, in relation to the pressure of the second fluid, is at a desired pressure differential;
  a regulator inlet, configured to be fluidly connected to a pressurized reactant supply;
  a first regulator outlet;
  a second regulator outlet;
  a first passage, fluidly connecting the regulator inlet and the first regulator outlet;
  a second passage, fluidly connecting the regulator inlet and the second regulator outlet;
  a first movable stem, configured to follow the movement of the flexible membrane, comprising a first plug configured to open and close the first passage depending on the position of the first movable stem; and
  a second movable stem, configured to follow the movement of the first movable stem after the first movable stem has been displaced by the flexible membrane by a set distance, comprising a second plug configured to open and close the second passage depending on the position of the second movable stem.

The flexible membrane, the first movable stem and the second movable stem may be arranged such that, as the pressure of the first fluid increases relative to the pressure of the second fluid, the flexible membrane depresses the first movable stem, thereby opening the first passage, and after having been displaced by the set distance, the first movable stem depresses the second movable stem, thereby opening the second passage.

The second movable stem may comprise an inner axial passage configured to allow movement of the first movable stem and to fluidly connect the regulator inlet and the first regulator outlet, while the first movable stem may be configured to move inside the inner axial passage of the second movable stem and engage the second movable stem after having been displaced by the flexible membrane by the set distance.

The invention may also provide an electric power generation system comprising:

a fuel cell stack, comprising a reactant stream inlet, a reactant stream outlet and at least one fuel cell;

a pressurized reactant supply;

a multiple jet ejector assembly, comprising:
  i) a suction inlet, fluidly connected to the reactant stream outlet to receive a recirculated flow from the fuel cell stack,
  ii) a discharge outlet, fluidly connected to the reactant stream inlet to provide an inlet stream to the fuel cell stack,
  iii) a first inlet fluidly connected to the pressurized reactant supply, and
  iv) a second inlet fluidly connected to the pressurized reactant supply; and the above-described pressure regulator, fluidly connected to, and interposed between, the pressurized reactant supply and the multiple jet ejector assembly, wherein the first regulator outlet is fluidly connected to the first inlet of the multiple jet ejector assembly and the second regulator outlet is fluidly connected to the second inlet of the multiple jet ejector assembly.

Specific details of certain embodiment(s) of the present apparatus/method are set forth in the detailed description below and illustrated in the enclosed Figures to provide an understanding of such embodiment(s). Persons skilled in the technology involved here will understand, however, that the present apparatus/method has additional embodiments, and/or may be practiced without at least some of the details set forth in the following description of preferred embodiment(s).

DETAILED DESCRIPTION OF THE INVENTION

Figure 1:
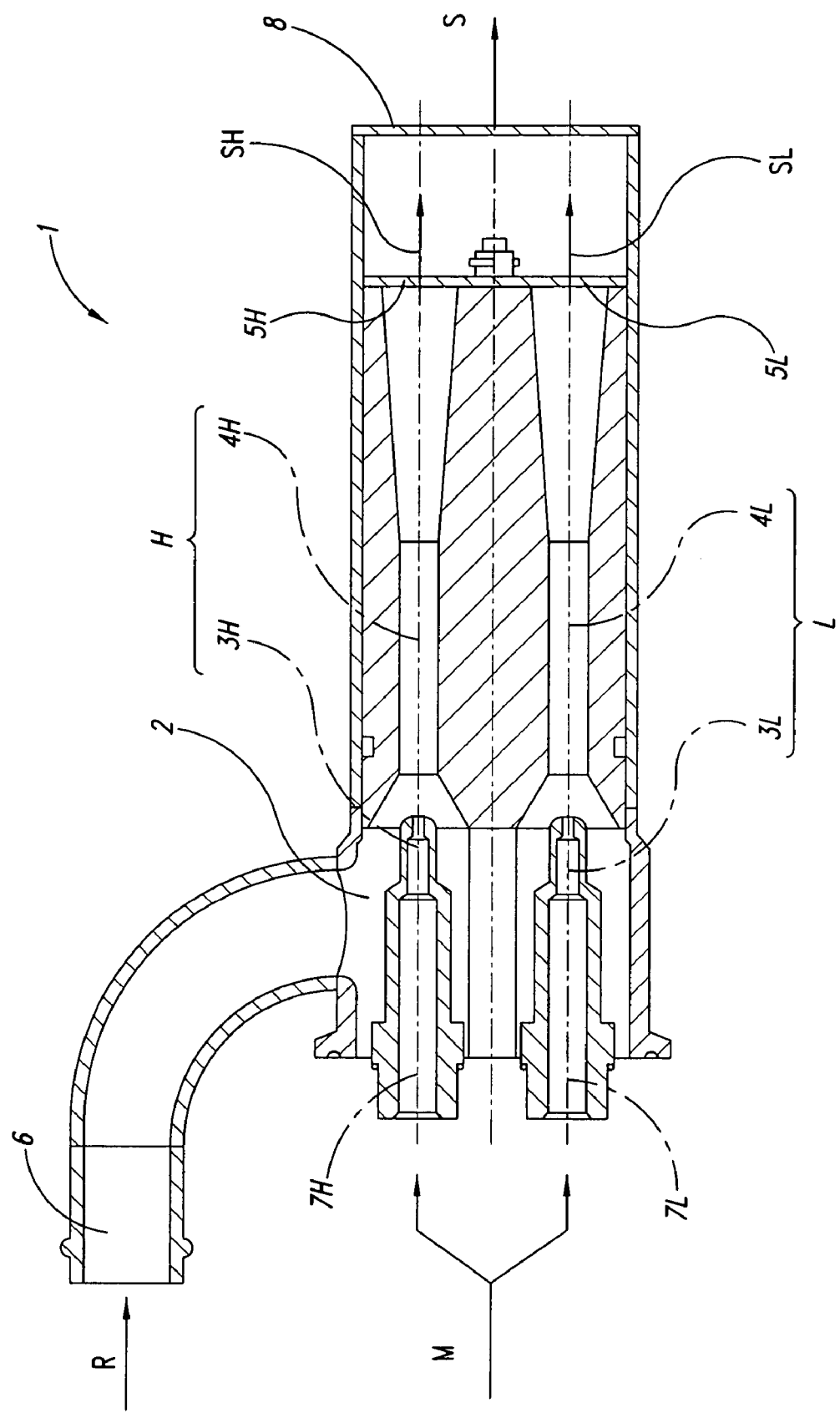
FIG. 1 is a side sectional view of an embodiment of a double jet ejector.

FIG. 1 shows a double jet ejector 1 according to an embodiment of the invention. Jet ejector 1 includes a common suction chamber 2, a low-flow nozzle 3L and a low-flow diffuser 4L (which, for the sake of simplicity, will collectively be referred to below as low-flow ejector L), a low-flow check valve 5L, a high-flow nozzle 3H and a high-flow diffuser 4H (which, for the sake of simplicity, will collectively be referred to below as high-flow ejector H), a high-flow check valve 5H, a suction inlet 6, fluidly connected to common suction chamber 2, a low-flow motive inlet 7L, fluidly connected to low-flow nozzle 3L, a high-flow motive inlet 7H, fluidly connected to high-flow nozzle 3H, and a discharge outlet 8, fluidly connected to low-flow and high-flow diffusers 4L and 4H. Suction inlet 6 is configured to receive a recirculated flow R from a fuel cell stack's exhaust stream outlet, low-flow motive inlet 7L and high-flow motive inlet 7H are configured to receive a motive flow M from a supply stream source and discharge outlet 8 is configured to provide an inlet stream S to a fuel cell stack. Inlet stream S is therefore formed by the merger of recirculated flow R and motive flow M.

Having common suction chamber 2 allows for a more compact design when compared to systems with two (or more) separate jet ejectors. Common suction chamber 2 is typically cylindrical, but is not limited to such geometrical characteristic.

Low-flow ejector L is designed to operate efficiently in the low-load spectrum of operating conditions of a fuel cell stack. Specifically, low-flow ejector L is designed so that low-flow nozzle 3L and low-flow diffuser 4L are as large as possible keeping in mind that, at idle operating conditions, a sufficient suction must be created in common suction chamber 2 to entrain recirculated flow R and a sufficient inlet stream S must be provided.

High-flow ejector H is designed to operate efficiently in the medium to high-load spectrum of operating conditions of a fuel cell stack. Specifically, high-flow ejector H is designed so that high-flow nozzle 3H and high-flow diffuser 4H are as small as possible keeping in mind that, at maximum flow conditions, a sufficient suction must be created in common suction chamber 2 to entrain recirculated flow R and a sufficient inlet stream S must be provided. Maximum flow conditions not only include the flow necessary during full-load operating conditions of the fuel cell stack, but also include the flow necessary during purging operations and during fuel cell system pressure increase operations.

To avoid flow, exiting either one of low-flow ejector L or high-flow ejector H, from returning to common suction chamber 2 via the other ejector, one-way valves are placed at each ejector's outlet. In this embodiment, low-flow and high-flow one-way check valves 5L and 5H are positioned at the end of diffusers 4L and 4H respectively, the check valves being simple flap valves which allow streams SL and SH to flow out of diffusers 4L and 4H respectively, but nothing to flow in. Stream SL and/or stream SH produce(s) inlet stream S.

To avoid check valves, a single diffuser may be placed downstream of low-flow nozzle 3L and high-flow nozzle 3H, i.e., common suction chamber 2 would be fluidly connected to a single diffuser which, in turn, would produce inlet stream S. However aligning more than one nozzle with a single diffuser may be problematic: any flow exiting a nozzle and entering a diffuser off such diffuser's central axis can lead to decreases in flow optimization. Furthermore, each nozzle works optimally with a particular diffuser configuration: having a single diffuser for both nozzles can also lead to decreases in flow optimization.

For reasons of manufacturing simplicity amongst others, low-flow nozzle 3L and high-flow nozzle 3H are typically subsonic (i.e., low-flow nozzle 3L and high-flow nozzle 3H cannot generate supersonic flow). It is however understood that supersonic nozzles are possible pursuant to the invention. Therefore, in one embodiment (subsonic nozzles), low-flow ejector L has a choking point, beyond which increases of motive flow M to low-flow ejector L results in lower rates of increase in the suction power of low-flow ejector L and in the flow of inlet stream S. Consequently, the transition point T, where the course of motive flow M is switched from low-flow ejector L to high-flow ejector H, typically occurs around the point where low-flow ejector L starts choking motive flow M However, it is understood that transition point T can occur at other points.

When motive flow M is switched from low-flow ejector L to high-flow ejector H, the pressure of motive flow M is reduced, as high-flow ejector H needs a lower pressure motive flow M than low-flow ejector L does to generate the same inlet stream S. From transition point T onwards, the pressure of motive flow M (now directed to high-flow ejector H) then starts increasing again until full-load conditions. The consequent problem with the pressure of motive flow M being reduced when transition point T is reached, is that the suction in common suction chamber 2 (now generated by high-flow ejector H) experiences a drop leading to a temporary inadequate suction level ("transition point T problem"): only as the pressure of motive flow M starts increasing again will the needed suction in common suction chamber 2 be generated by high-flow ejector H.

Having motive flow M feed both low-flow ejector L and high-flow ejector H from transition point T onwards (as opposed to switching motive flow M from low-flow ejector L to high-flow ejector H) may not help to satisfactorily address the transition point T problem, as explained in further details below, with reference to FIG. 2.

Figure 2:
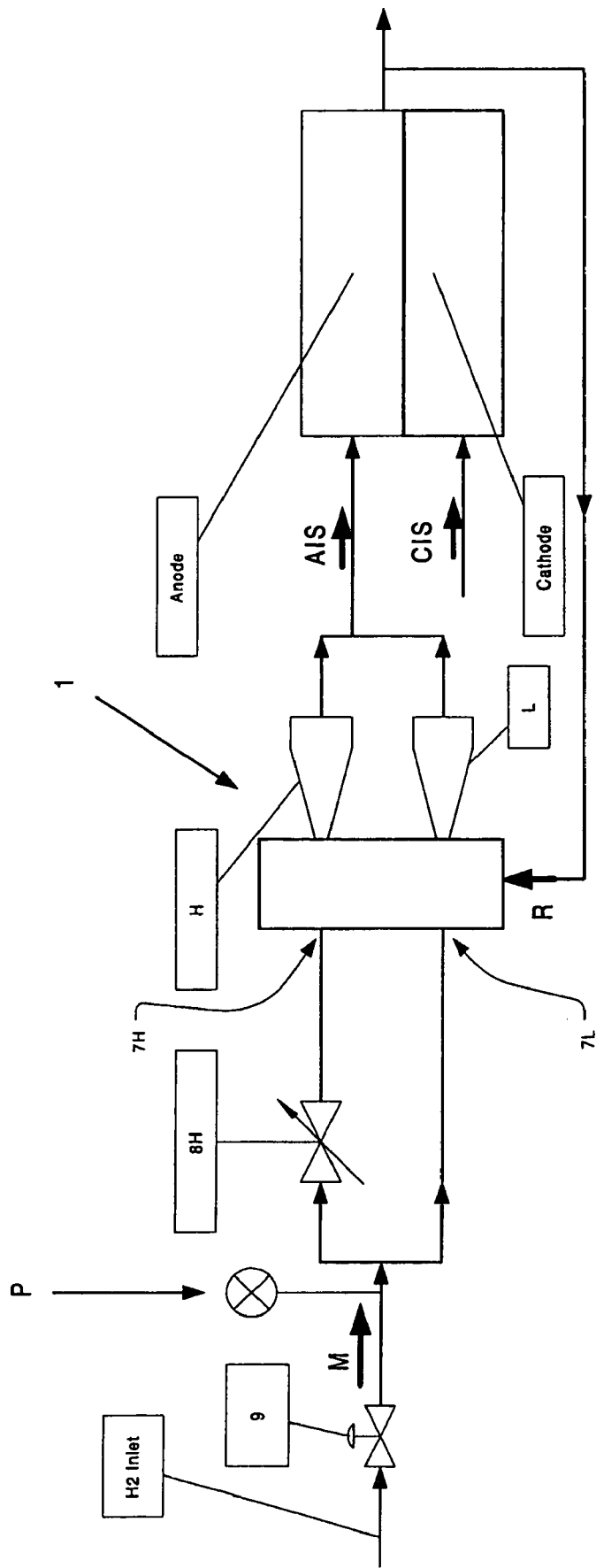
FIG. 2 is a schematic diagram of a fuel cell based electric power generation system with a double jet ejector, a regulator and an on-off solenoid valve for recirculation of the fluid fuel stream.

FIG. 2 shows double jet ejector 1 being operated on the anode side of a fuel cell stack system where the desired fuel stream pressure is to be maintained at a desired steady-state pressure differential with the oxidant stream. Such differential can be zero or negative, but it is typically positive (i.e., fuel stream pressure higher than oxidant stream pressure) as leakage of fuel into the oxidant stream due to MEA failure is preferred to leakage of oxidant into the fuel stream.

In the embodiment shown in FIG. 2, fuel originates from a high pressure source (pressurized hydrogen) and is controlled by pressure regulator 9. Pressure regulator 9 is configured to maintain a desired steady-state pressure differential between anode inlet stream AIS and cathode inlet stream CIS (for reasons of simplicity, the source of cathode inlet stream CIS is not shown in FIG. 2). Pressure regulator 9 controls motive flow M directed to double jet ejector 1 and on-off solenoid valve 8H controls the feed of motive flow M to high-flow ejector H. The system shown in FIG. 2 operates as follows: from idle conditions upwards, regulator 9 controls motive flow M directed to low-flow ejector L. When transition point T is reached, solenoid valve 8H opens. In the current embodiment, transition point T is determined in relation to the pressure of motive flow M. Consequently, a pressure transducer P, which measures the pressure of motive flow M, controls solenoid valve 8H. It is however understood that transition point T can be determined in relation to other factors, such as the state of regulator 9 or the rate of increase in the pressure of anode inlet stream AIS, in which case other apparatus besides pressure transducer P would control the opening and closing of solenoid valve 8H.

As transition point T is reached and solenoid valve 8H opens, regulator 9 automatically reduces the pressure of motive flow M (indeed, a lower pressure motive flow M is now needed to be fed to high-flow ejector H than was needed to be fed to low-flow ejector L in order to generate the same inlet stream S that was occurring as transition point T was reached). Regulator 9 then starts increasing the pressure of motive flow M again, until full-load conditions are reached. However, this may not satisfactorily address the transition point T problem because the reduction in suction in common suction chamber 2 consequent on low-flow ejector L being fed a lower pressure motive flow M is typically not compensated for by the suction high-flow ejector H is able to generate with such low pressure motive flow M (so that an unacceptable suction drop occurs in common suction chamber 2).

Figure 3:
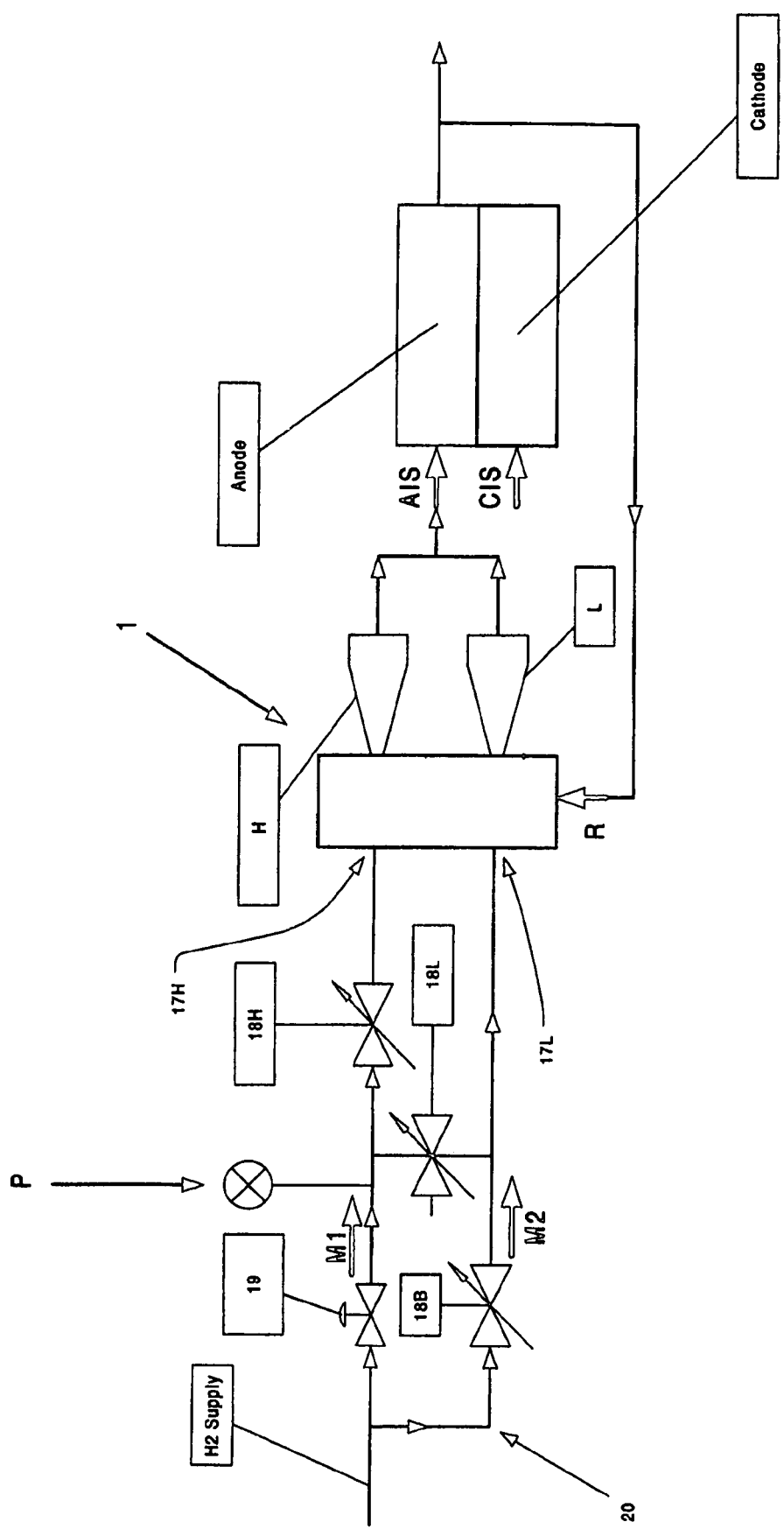
FIG. 3 is a schematic diagram of a fuel cell based electric power generation system with a double jet ejector, a regulator and three on-off solenoid valves for recirculation of the fluid fuel stream.

Adding further ejectors between low-flow ejector L and high-flow ejector H, all sharing a common suction chamber (i.e., having a triple or quadruple jet ejector), is one option for addressing the transition point T problem. However, this option may create manufacturing and spatial arrangement concerns. Another option is with the use of a regulator 19 and three on-off solenoid valves (18H, 18L and 18B), as shown in FIG. 3. Operation of double jet ejector 1 according to this embodiment is as follows.

Starting at idle flow conditions (low-load condition), by-pass solenoid valve 18B and high-flow solenoid valve 18H are closed, while low-flow solenoid valve 18L is open. As a result, a first motive flow M1, controlled by regulator 19 is directed exclusively to low-flow ejector L (via low-flow motive inlet 17L). When transition point T is reached, low-flow solenoid valve 18L closes and high-flow solenoid valve 18H opens, so that first motive flow M1, controlled by regulator 19, is directed to high-flow ejector H (via high-flow motive inlet 17H): for the reasons explained above, when first motive flow M1 is switched from low-flow ejector L to high-flow ejector H (i.e., when transition point T is reached), regulator 19 reduces the pressure of first motive flow M1 and then starts increasing it again. However, the typical consequent suction drop in common suction chamber 2 does not occur because of the following reasons.

At substantially the same time as when transition point T is reached, by-pass solenoid valve 18B opens, so that second motive flow M2 is directed to low-flow ejector L (via by-pass line 20). Although it can be determined in relation to other factors, in the current embodiment, transition point T is determined in relation to the pressure of first motive flow M1 via pressure transducer P. More specifically, transition point T occurs when the pressure of first motive flow M1, controlled by regulator 19, is substantially the same as that of the pressurized hydrogen supply. As a result, when transition point T occurs, the closing of low-flow solenoid valve 18L and the opening of by-pass solenoid valve 18B results in substantially no feed change to low-flow ejector L, as first motive flow M1, which is substantially the same as that of the pressurized hydrogen supply, is replaced by second motive flow M2, which is also substantially the same as that of the pressurized hydrogen supply. Consequently, low-flow ejector L continues to provide the required suction in common suction chamber 2 as well as the required anode inlet stream AIS. As a result, the reduction in the pressure of first motive flow M1 by the action of regulator 19, when transition point T occurs, does not result in an unsatisfactory suction drop in common suction chamber 2. Past transition point T, regulator 19 then starts increasing the pressure of first motive flow M1, so that high-flow ejector H starts to increasingly contributing to anode inlet stream AIS as well as the required suction in common suction chamber 2.

The underlying principle behind the system outlined above and shown in FIG. 3 can also be employed with multiple jet ejectors (such as triple and quadruple jet ejectors). Indeed, the principle of feeding lower-flow ejectors with full flow as higher-flow ejectors are being used is not intrinsically limited to double jet ejectors. However, as the number of jet ejectors increases, so does the number of regulators and solenoid valves, consequently creating spatial arrangement concerns.

Figure 4:
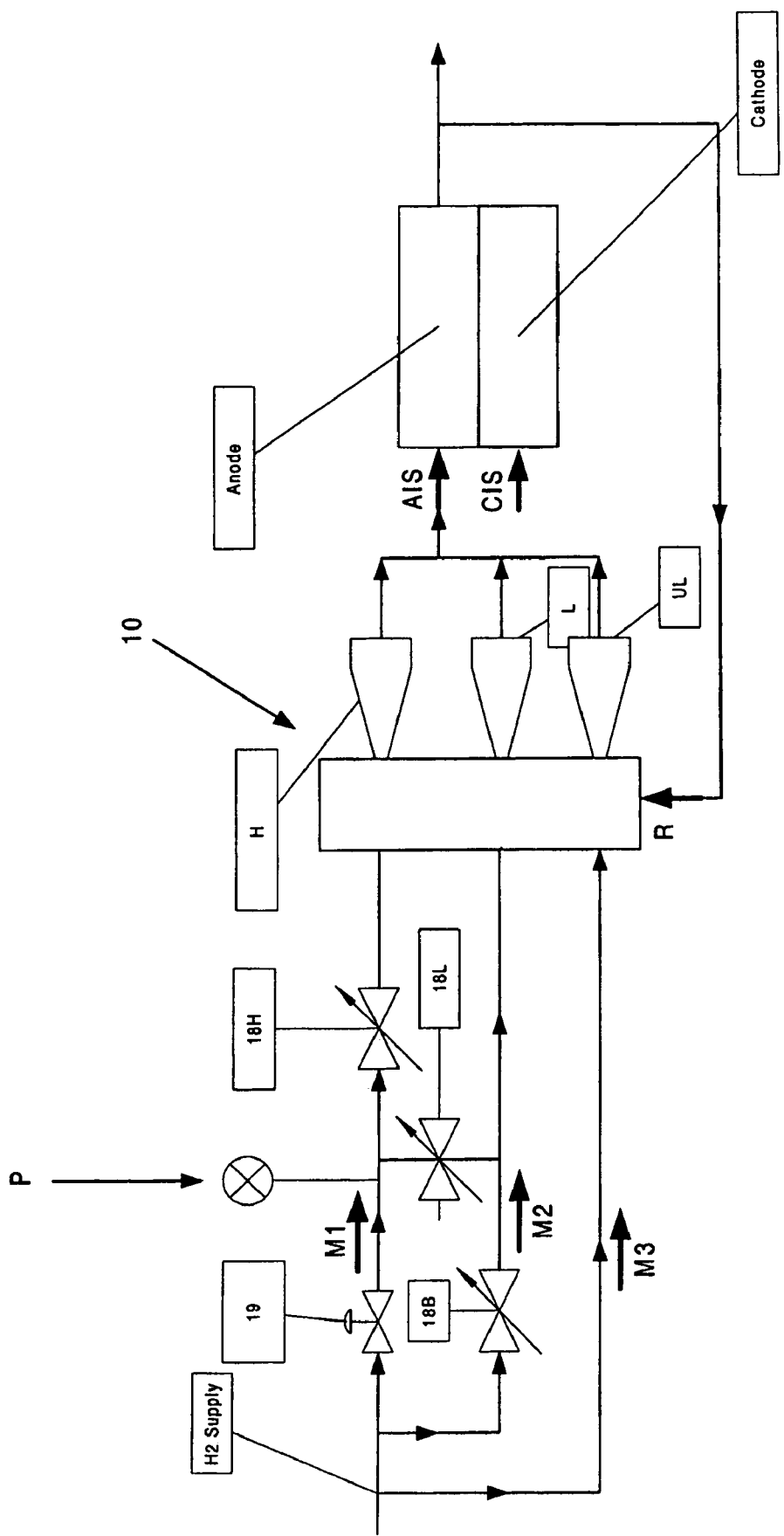
FIG. 4 is a schematic diagram of a fuel cell based electric power generation system with a triple jet ejector, a regulator and three on-off solenoid valves for recirculation of the fluid fuel stream.

Whereas the above described embodiment can adequately handle up-transient conditions in typical motor vehicle application, problems could arise in severe down-transient conditions. Indeed, referring to FIG. 3, a rapid load reduction would not only result in high-flow solenoid valve 18H and by-pass solenoid valve 18B being closed and low-flow solenoid valve 18L being opened, but also in regulator 19 being temporarily closed. Although this would address the request to rapidly reduce the supply of anode inlet stream AIS, it would result in an undesirable stoppage of recirculated flow R. As shown in FIG. 4, this problem can be addressed by adding an ultra-low-flow ejector UL that would be constantly fed with a third motive flow M3, which is substantially the same as that of the pressurized hydrogen supply, irrespective of operating conditions (thereby creating a triple-jet ejector 10). In one embodiment, the nozzle of ultra-low-flow ejector UL is positioned in common suction chamber 2, along with low-flow ejector L and high-flow ejector H, as it is the most efficient location from a space-saving perspective; it is however possible to have the nozzle of ultra-low-flow ejector UL positioned in a different suction chamber pursuant to the invention. Ultra-low-flow ejector UL is designed to supply a percentage of idle-load requirement and still provide the necessary suction in common suction chamber 2 to maintain a minimum recirculated flow R.

Because ultra-low-flow ejector UL is constantly fed with a high pressure stream, there is typically no likelihood of having flow, exiting either one of low-flow ejector L or high-flow ejector H, returning to common suction chamber 2 via ultra-low-flow ejector UL. Consequently, there is typically no need to have a one-way check valve positioned at the downstream end of ultra-low-flow ejector UL. It is however understood that particularities of a fuel cell system may require that a one-way check valve be positioned at the downstream end of ultra-low-flow ejector UL.

It should be noted that, according to the invention, the functions performed by a valve-type regulator and a downstream on-off solenoid valve can be combined in a pulse-width modulated valve, such as a fuel ejector. For example, referring to FIG. 4, by replacing on-off solenoid valves (i.e., 18H and 18L) with pulse-width modulated valves, regulator 19 could be eliminated. Not only can the pressure of motive flow M reaching low-flow ejector L/high-flow ejector H be controlled by the modulated valves (by varying the pulse width), but whether motive flow M reaches low-flow ejector L and/or high-flow ejector H can also be controlled (by leaving the modulated valves either closed or in operation).

Figure 5:
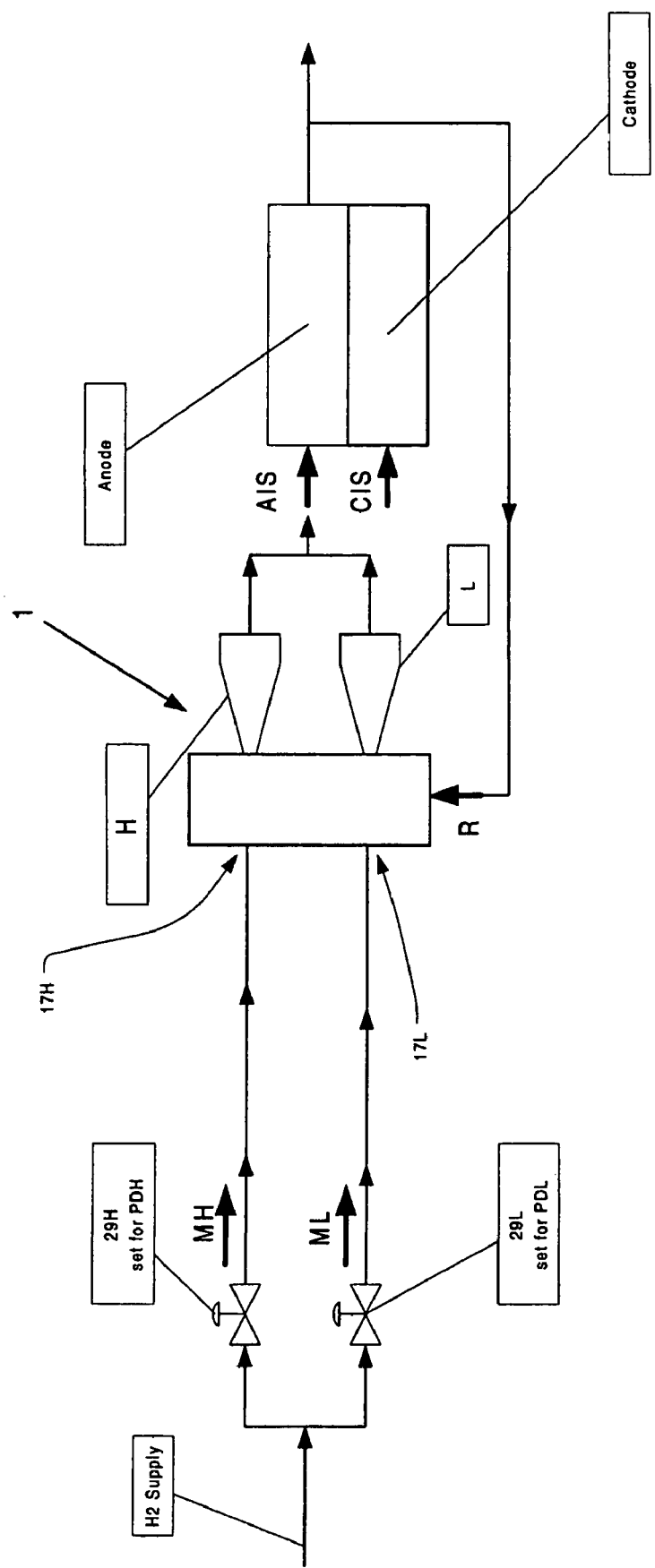
FIG. 5 is a schematic diagram of a fuel cell based electric power generation system with a double jet ejector and two regulators for recirculation of the fluid fuel stream.

Another way to address the transition point T problem is to replace the three on-off solenoid valves (18H, 18L and 18B) shown in FIGS. 3 and 4 with a second regulator, with each regulator configured to maintain a different desired steady-state pressure differential between anode inlet stream AIS and cathode inlet stream CIS. FIG. 5 shows how this change would apply to the system shown in FIG. 3 (but it is understood that the system shown in FIG. 4 could similarly be modified).

Referring to FIG. 5, high-flow regulator 29H is fluidly connected to high-flow motive inlet 17H and controls motive flow MH directed to high-flow ejector H, whereas low-flow regulator 29L is fluidly connected to low-flow motive inlet 17L and controls motive flow ML directed to low-flow ejector L. High-flow regulator 29H is configured to maintain a desired steady-state pressure differential PDH and low-flow regulator 29L is configured to maintain a desired steady-state pressure differential PDL, with steady-state pressure differential PDH being lower than steady-state pressure differential PDL (PDH<PDL). For example, high-flow regulator 29H may be configured to maintain the pressure of anode inlet stream AIS at 1 pound-per-square-inch (psi) over the desired steady-state pressure of cathode inlet stream CIS (i.e., desired steady-state pressure differential PDH is +1 psi) and low-flow regulator 29L may be configured to maintain the pressure of anode inlet stream AIS at 4 psi over the desired steady-state pressure of cathode inlet stream CIS (i.e., desired steady-state pressure differential PDL is +4 psi).

Figure 5A:
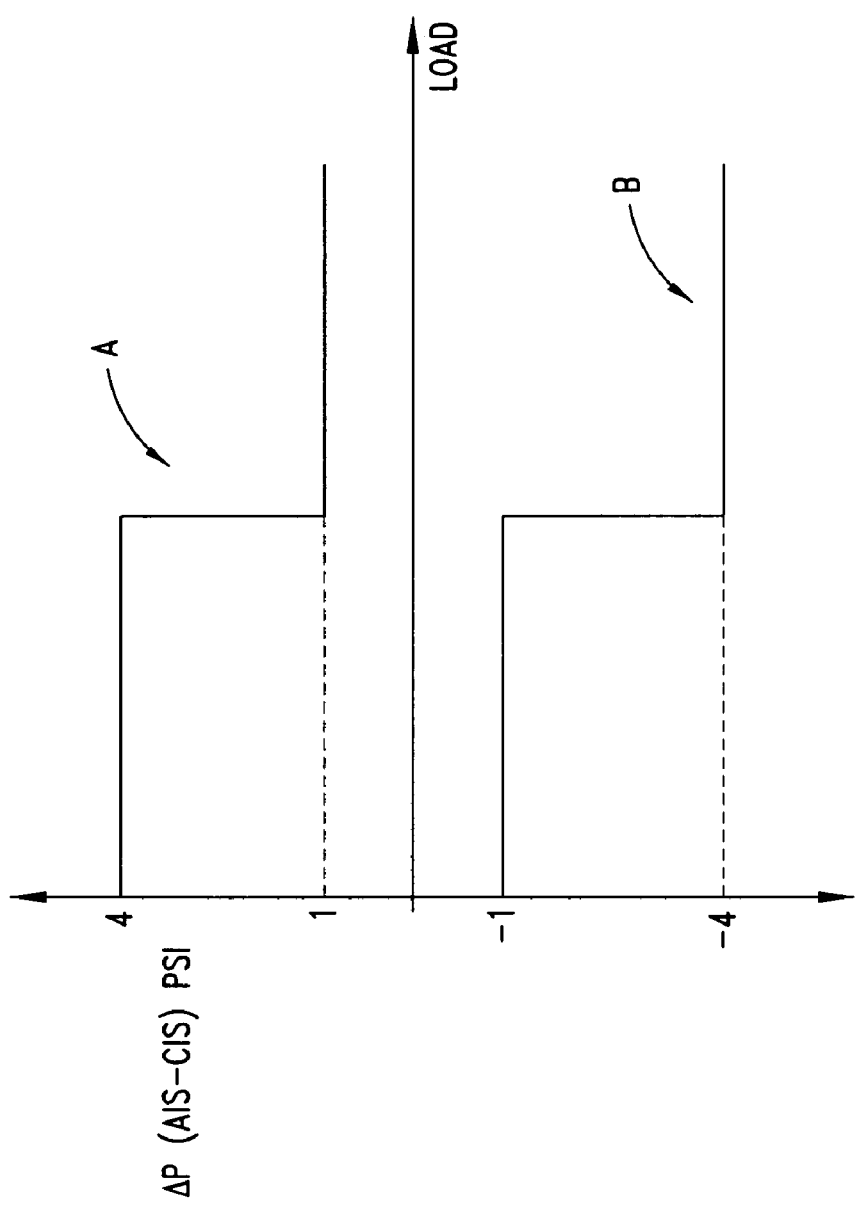
FIG. 5A is an ideal graph of a fuel cell system's differential pressure against load demand during operation of the fuel cell system of FIG. 5.

Referring to FIG. 5 and FIG. 5A, the latter being an ideal graph of a fuel cell system's differential pressure against load demand during operation of the fuel cell system of FIG. 5, a fuel cell system would operate as follows. Referring to line A of FIG. 5A, at low-load demand, the system would be operating at the higher steady-state pressure differential PDL (i.e., referring to the above noted example, the system would be operating at +4 psi pressure differential). As load-demand increases, low-flow regulator 29L opens to maintain such higher steady-state pressure differential PDL, i.e., low-flow regulator 29L would vary motive flow ML. Meanwhile, high-flow regulator 29H would remain closed as it would be detecting a pressure differential (PDL) that is higher than what it is trying to maintain (PDH), i.e., high-flow regulator 29H would not direct any motive flow MH to high-flow ejector H. When low-flow regulator 29L is fully opened, further load-demand increases result in a fall in the pressure differential of the system (as the pressure of anode inlet stream AIS can no longer be satisfactorily increased versus the increasing pressure of cathode inlet stream CIS). As soon as such pressure differential endeavors to fall below lower steady-state pressure differential PDH (i.e., referring to the above noted example, as soon as the system's pressure differential endavour to fall below +1 psi pressure differential), high-flow regulator 29H starts to open to maintain such lower steady-state pressure differential PDH (i.e., high-flow regulator 29H would vary motive flow MH). Meanwhile, low-flow regulator 29L remains fully opened as it is attempting, without success, to bring back the pressure differential to the higher steady-state pressure differential PDL (i.e., referring to the above noted example, low-flow regulator 29L is attempting, without success, to increase the pressure of anode inlet stream AIS so that it is 4 psi over the pressure of cathode inlet stream CIS). This embodiment is advantageous where transition point T is to occur when further increases in the pressure of motive flow ML leads to inadequate increases in the pressure of anode inlet stream AIS. It has the advantage of not requiring the circuitry necessary in the embodiments shown in FIGS. 3 and 4. However, where transition point T is to occur before further increases in the pressure of motive flow ML leads to inadequate increases in the pressure of anode inlet stream AIS, this embodiment is not advantageous. Furthermore, this embodiment may not be advantageous in fuel cell systems where operations at varying desired steady-state pressure differential may lead to undesirable instabilities.

It is understood that negative desired steady-state pressure differentials are possible pursuant to the invention. For example, high-flow regulator 29H could be configured to maintain the pressure of anode inlet stream AIS at 4 pound-per-square-inch (psi) below the desired steady-state pressure of cathode inlet stream CIS (i.e., desired steady-state pressure differential PDH is −4 psi). Low-flow regulator 29L could then be configured to maintain the pressure of anode inlet stream AIS at 1 psi below the desired steady-state pressure of cathode inlet stream CIS (i.e., desired steady-state pressure differential PDL is −1 psi), so that steady-state pressure differential PDH remains lower than steady-state pressure differential PDL (PDH<PDL). This alternate embodiment is represented by line B in FIG. 5A.

Figure 6:
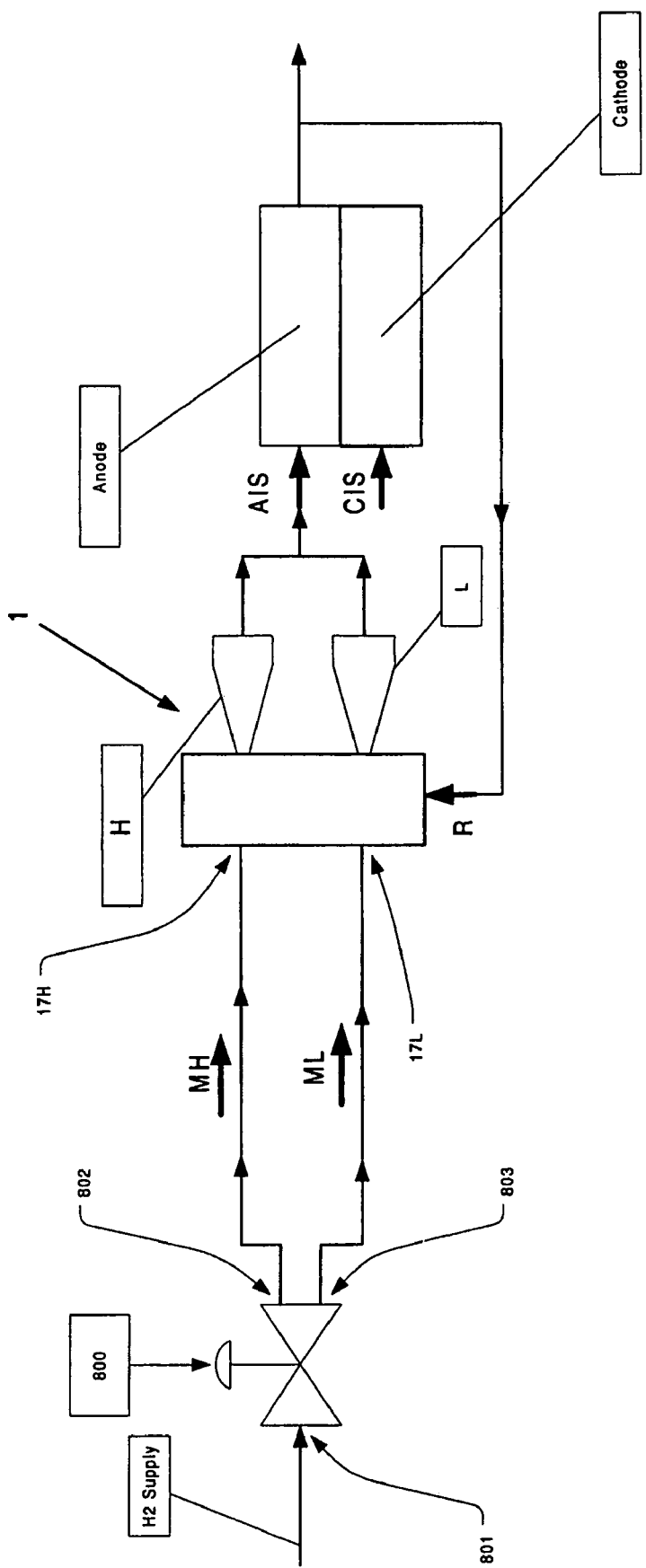
FIG. 6 is a schematic diagram of a fuel cell based electric power generation system with a double jet ejector and a double action regulator for recirculation of the fluid fuel stream.

Another way to address the transition point T problem is to replace the three on-off solenoid valves (18H, 18L and 18B) and the regulator (9 or 19) shown in FIGS. 3 and 4 with a double-action pressure regulator, which will be described in further details below. FIG. 6 shows how this change would apply to the system shown in FIG. 3 (but it is understood that the system shown in FIG. 4 could similarly be modified). Referring to FIG. 6, double-action pressure regulator 800 has one inlet 801, fluidly connected to a high pressure source (pressurized hydrogen), and two outlets, high-flow outlet 802 and low-flow outlet 803. High-flow outlet 802 is fluidly connected to high-flow motive inlet 17H and feeds motive flow MH to high-flow ejector H, whereas low-flow outlet 803 is fluidly connected to low-flow motive inlet 17L and feeds motive flow ML to low-flow ejector L. As will be explained in more details below, double-action pressure regulator 800 regulates both motive flow MH and motive flow ML to maintain a desired steady-state pressure differential between anode inlet stream AIS and cathode inlet stream CIS.

Figure 7:
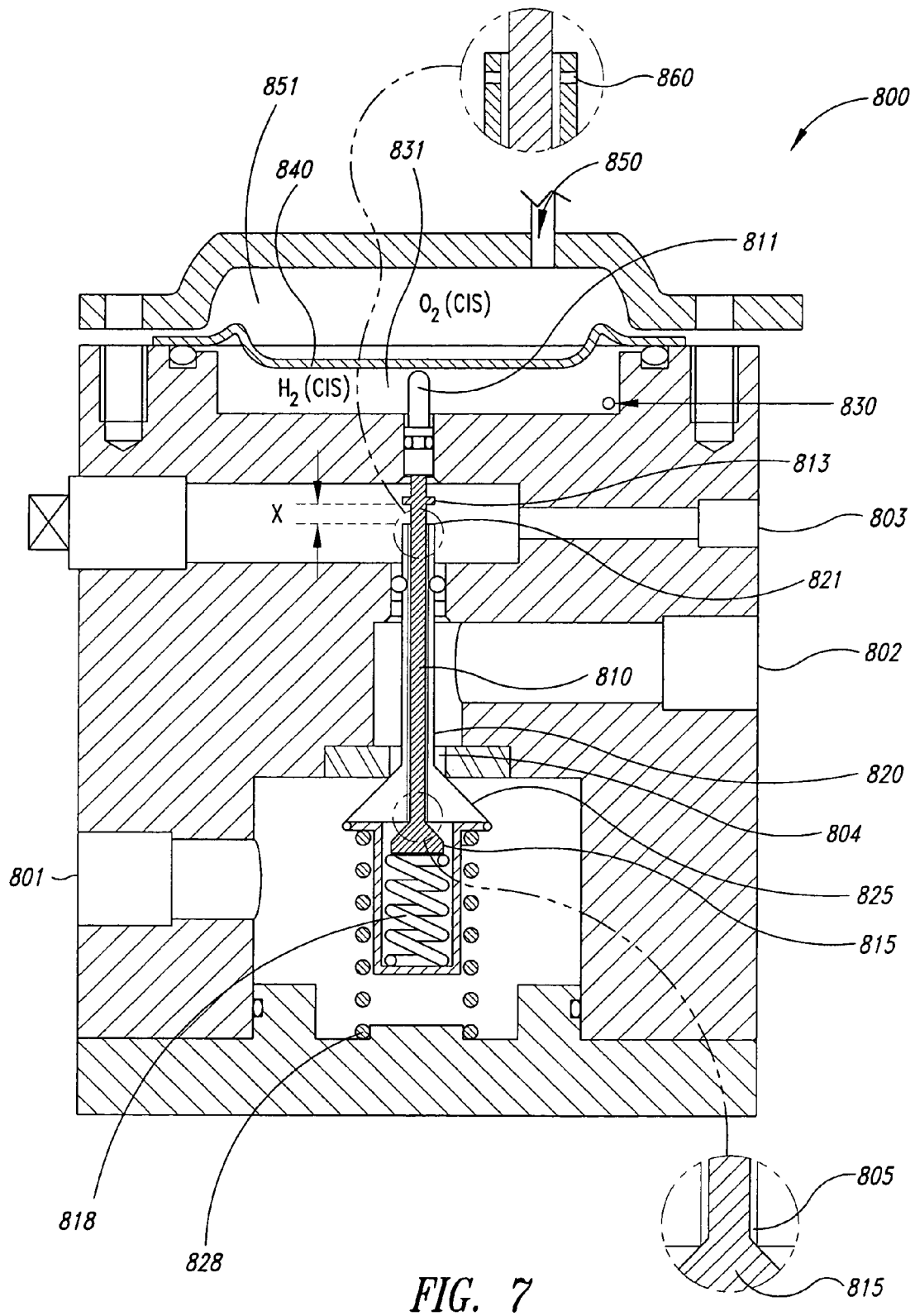
FIG. 7 is a side sectional view of one embodiment of the double action pressure regulator illustrated schematically in FIG. 6.

FIG. 7 is a side sectional view of an embodiment of double-action pressure regulator 800 illustrated schematically in FIG. 6. As described above, pressure regulator 800 has one regulator inlet 801, fluidly connected to a high pressure source, and high and low flow outlets 802 and 803, fluidly connected to high-flow ejector M and low-flow ejector L, respectively, of FIG. 6. Pressure regulator 800 also has a first passage 805, fluidly connecting regulator inlet 801 and low-flow outlet 803, and a second passage 804, fluidly connecting regulator inlet 801 and high-flow outlet 802. Furthermore, pressure regulator 800 is fluidly connected to a reference fuel feedback line 830 from anode inlet stream AIS and to a reference oxidant feedback line 850 from cathode inlet stream CIS.

In operation, reference fuel feedback line 830 is fed into fuel reference chamber 831 and reference oxidant feedback line 850 is fed into oxidant reference chamber 851. Fuel and oxidant reference chambers 831 and 851 are fluidly separated by a flexible membrane 840 which is biased to be in a state of equilibrium whenever the pressure differential between the two chambers (831 and 851) is substantially the same as the desired steady-state pressure differential between anode inlet stream AIS and cathode inlet stream CIS (for the sake of clarity, the biasing means are not shown in FIG. 7).

Pressure regulator 800 can be used advantageously in a system where the desired pressure in a first stream is set according to load demand and the desired pressure in a second stream is varied to maintain a desired steady-state pressure differential between the first and the second stream. For example, in a system where desired oxidant pressure is set according to load demand, the desired fuel stream pressure can be regulated by pressure regulator 800 to maintain the desired steady-state pressure differential between the fuel and oxidant streams.

In such systems, a load increase results in an increase in oxidant pressure, which leads to a decrease in the pressure of the reference fuel stream relative to the pressure of the reference oxidant stream. As a result, flexible membrane 840 moves towards fuel reference chamber 831. Flexible membrane 840 contacts first end 811 of first movable stem 810 and depresses first movable stem 810, and consequently first plug 815. First plug 815 may be conically shaped so that its movement inside first passage 805 leads to its gradual opening (or closure). Therefore, the movement of flexible membrane 840 gradually opens first passage 805 and directs the pressurized fuel stream to low-flow ejector L through low-flow outlet 803.

First movable stem 810 is positioned inside an inner axial passage of a second movable stem 820, so that the fluid connection between regulator inlet 801 and low-flow outlet 803 occurs via the volume of the passage within second movable stem 820 not taken up by first movable stem 810. The volume of the passage within second movable stem 820 not taken up by first movable stem 810 must be large enough to allow a sufficient flow from regulator inlet 801 to low flow outlet 803.

First plug 815 will continue to open first passage 805 until the desired steady-state pressure differential between the fuel and oxidant streams is restored, at which point flexible membrane 840 will stop moving and settle into a new equilibrium point.

However, for certain load increases, opening first passage 805 fully will not restore the desired steady-state pressure differential between the fuel and oxidant streams (i.e., low-flow ejector L is no longer able restore the desired steady-state pressure differential). As a result, flexible membrane 840 will continue its movement towards fuel reference chamber 831. After travelling a set distance X, protrusion 813 of first movable stem 810 contacts first end 821 of second movable stem 820. In the embodiment shown in FIG. 7, protrusion 813 has a flat lower portion which is shaped to contact satisfactorily with first end 821. However, it is understood that various combinations of shapes are possible. Furthermore, in the embodiment shown in FIG. 7, distance X is set so that, when protrusion 813 contacts first end 821, first passage 805 is fully opened. However, it is understood that distance X is set so that protrusion 813 contacts first end 821 when transition point T is reached which, as outlined above, may occur at various points.

In the embodiment shown in FIG. 7, when protrusion 813 of first movable stem 810 contacts first end 821 of second movable stem 820, the fluid connection between regulator inlet 801 and low-flow outlet 803 is interfered with. Consequently, openings 860 are present in first end 821 of second movable stem 820. It is however understood that a protrusion that does not interfere with the fluid connection between regulator inlet 801 and low-flow outlet 803 is possible pursuant to the invention, so first end 821 of second movable stem 820 without openings 860 is possible.

After protrusion 813 contacts first end 821 of second movable stem 820, further movement of flexible membrane 840 towards fuel reference chamber 831 depresses second movable stem 820, and consequently second plug 825. Second plug 825 may be conically shaped so that its movement inside second passage 804 leads to its gradual opening (or closure). Therefore, the movement of flexible membrane 840 after protrusion 813 contacts first end 821 of second movable stem 820, gradually opens second passage 804 and directs pressurized fuel stream to high-flow ejector H through high-flow outlet 802. Second plug 825 will continue to open second passage 804 until the desired steady-state pressure differential between the fuel and oxidant streams is restored, at which point flexible membrane 840 will stop moving and settle into a new equilibrium point.

As further shown in FIG. 7, both first plug 815 and second plug 825 engage first and second spring mechanisms 818 and 828, respectively. First and second spring mechanisms 818 and 828 enable the foregoing process to be repeated in reverse (i.e., in a load decrease situation). First and second spring mechanisms 818 and 828 also assist in having fuel not seep past the relevant plug (i.e., first and second plugs 815 and 825) when the relevant movable stem (i.e., first and second movable stem 810 and 820) is not depressed; it should however be noted that this is mainly accomplished by the effect of the high pressure source being fluidly connected to first and second plugs 815 and 825 (via regulator inlet 801).

In order not to unduly interfere with the biasing means, which ensure that there is a state of equilibrium whenever the pressure differential between the two chambers (831 and 851) is substantially the same as the desired steady-state pressure differential between anode inlet stream AIS and cathode inlet stream CIS, first and second spring mechanisms 818 and 828 generate significantly lesser forces than such biasing means.

Although the embodiment shown in FIG. 7 is configured to regulate flow to double-ejectors, it is understood that the invention is not limited to such embodiment. Indeed, such embodiment can be modified to regulate multiple jet-ejectors (e.g., triple or quadruple jet ejectors) by adding further movable stems and associated plugs, which gradually open further passages and direct pressurized fuel stream to further ejectors through further outlets.

Furthermore, although the foregoing examples relate to power generation systems in which the fluid fuel stream is recirculated, it is understood that a jet ejector could also be incorporated into a fuel cell based electric power generation system employing substantially pure oxygen, originating from a high-pressure source, as the oxidant stream, the jet ejector being used to recirculate the exhaust oxidant stream. In this regard, essentially the same principles set forth above with respect to jet ejector recirculation of the fluid fuel stream could apply to jet ejector recirculation of the fluid oxidant stream.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A reactant supply system for a fuel cell system having a fuel cell stack with an inlet stream and an exhaust stream, the reactant supply system comprising:
    an apparatus for recirculating a reactant fluid stream of the fuel cell system, the apparatus comprising:
        a common suction chamber fluidly connected to a suction inlet configured to receive a recirculated flow from the exhaust stream of the fuel cell stack;
        a low-flow nozzle positioned in the common suction chamber and fluidly connected to a low-flow motive inlet configured to receive a first motive flow from a reactant source of the fuel cell stack;
        a low-flow diffuser fluidly connected to a discharge outlet configured to provide the inlet stream to the fuel cell stack;
        a high-flow nozzle positioned in the common suction chamber and fluidly connected to a high-flow motive inlet configured to receive the first motive flow from the reactant source; and
        a high-flow diffuser fluidly connected to the discharge outlet;
    a regulator, fluidly connected to, and interposed between, the reactant source of the fuel cell stack and the low-flow and high-flow motive inlets, for regulating the first motive flow to the apparatus; and
    a first solenoid valve, fluidly connected to, and interposed between, the high-flow motive inlet and the regulator, wherein, the first solenoid valve is not interposed between the low-flow motive inlet and the regulator, and wherein the low-flow motive inlet is fluidly connected to the reactant source of the fuel cell stack such that, during operation of the fuel cell system, the first motive flow is directed to only the low-flow motive inlet when the first solenoid valve is closed and the first motive flow is directed to both the low-flow and high-flow motive inlets when the first solenoid valve is open.

2. The reactant supply system of claim 1, wherein the common suction chamber is substantially cylindrical.

3. The reactant supply system of claim 1, wherein the apparatus further comprises:
    a low-flow one-way check valve for preventing flow regress through the low-flow diffuser; and
    a high-flow one-way check valve for preventing flow regress through the high-flow diffuser.

4. The reactant supply system of claim 1, wherein:
    the low-flow nozzle and low-flow diffuser are configured to entrain the recirculated flow and provide the inlet stream at low-load conditions; and
    the high-flow nozzle and high-flow diffuser are configured to entrain the recirculated flow and provide the inlet stream at high-load conditions.

5. The reactant supply system of claim 4, wherein the apparatus further comprises:
    a low-flow one-way check valve for preventing flow regress through the low-flow diffuser; and
    a high-flow one-way check valve for preventing flow regress through the high-flow diffuser.

6. The reactant supply system of claim 1, wherein the apparatus further comprises:
    an ultra-low-flow nozzle positioned in the common suction chamber and fluidly connected to an ultra-low-flow motive inlet configured to receive a second motive flow from the reactant source; and
    an ultra-low-flow diffuser fluidly connected to the discharge outlet.

7. The reactant supply system of claim 6, wherein the common suction chamber is substantially cylindrical.

8. The reactant supply system of claim 6, wherein the apparatus further comprises:
    a low-flow one-way check valve for preventing flow regress through the low-flow diffuser; and
    a high-flow one-way check valve for preventing flow regress through the high-flow diffuser.

9. The reactant supply system of claim 8, wherein the apparatus further comprises an ultra-low-flow one-way check valve for preventing flow regress through the ultra-low-flow diffuser.

10. The reactant supply system of claim 6, wherein
    the low-flow nozzle and low-flow diffuser are configured to entrain the recirculated flow and provide the inlet stream at low-load conditions;
    the high-flow nozzle and high-flow diffuser are configured to entrain the recirculated flow and provide the inlet stream at high-load conditions; and
    the ultra-low-flow nozzle and ultra-low-flow diffuser are configured to entrain a portion of the recirculated flow and provide a portion of the inlet stream at idle-load conditions.

11. The reactant supply system of claim 10, wherein the apparatus further comprises:
    a low-flow one-way check valve for preventing flow regress through the low-flow diffuser; and
    a high-flow one-way check valve for preventing flow regress through the high-flow diffuser.

12. The reactant supply system of claim 10, wherein the apparatus further comprises an ultra-low-flow one-way check valve for preventing flow regress through the ultra-low-flow diffuser.

13. An electric power generation system comprising
    a fuel cell stack comprising a reactant stream inlet, a reactant stream outlet and at least one fuel cell;
    a pressurized reactant supply;
    a multiple ejector assembly, comprising:
        a first motive flow inlet fluidly connected to the pressurized reactant supply,
        a second motive flow inlet fluidly connected to the pressurized reactant supply,
        a suction inlet, fluidly connected to the reactant stream outlet to receive a recirculated flow from the fuel cell stack, and
        a discharge outlet, fluidly connected to the reactant stream inlet to provide an inlet stream to fuel cell stack;
    a regulator, fluidly connected to, and interposed between, the pressurized reactant supply and the first and second motive flow inlets of the multiple jet ejector assembly, for regulating a first motive flow to the multiple jet ejector assembly; and
    a first solenoid valve, fluidly connected to, and interposed between, the second motive flow inlet and the regulator, wherein, the first solenoid valve is not interposed between first motive flow inlet and the regulator, and wherein the first motive flow inlet is fluidly connected to the pressurized reactant supply such that, during operation of the electric power generation system, the first motive flow is directed to only the first motive flow inlet when the first solenoid valve is closed and the first motive flow is directed to both the first and second motive flow inlets when the first solenoid valve is open.

14. An electric power generation system comprising:
a fuel cell stack comprising a reactant stream inlet, a reactant stream outlet and at least one fuel cell;
a pressurized reactant supply;
a multiple jet ejector assembly, comprising:
  a first motive flow inlet fluidly connected to the pressurized reactant supply,
  a second motive flow inlet fluidly connected to the pressurized reactant supply,
  a suction inlet fluidly connected to the reactant stream outlet to receive a recirculated flow from the fuel cell stack, and
  a discharge outlet, fluidly connected to the reactant stream inlet to provide an inlet stream to the fuel cell stack;
a regulator, fluidly connected to, and interposed between, the pressurized reactant supply and the first and second motive flow inlets of the multiple jet ejector assembly, for regulating a first motive flow to the multiple jet ejector assembly;
a first solenoid valve, fluidly connected to, and interposed between, the first motive flow inlet and the regulator;
a second solenoid valve, fluidly connected to, and interposed between, the second motive flow inlet and the regulator;
a by-pass line, fluidly connecting the pressurized reactant supply to the second motive flow inlet, for supplying a second motive flow to the multiple jet ejector assembly; and
a by-pass solenoid valve, fluidly connected to, and interposed in the bypass line between, the pressurized reactant supply and the second motive flow inlet.

15. The electric power generation system of claim 14, wherein:
the first motive flow inlet is fluidly connected to a first nozzle and diffuser configured to entrain the recirculated flow and provide the inlet stream at high-load conditions; and
the second motive flow inlet is fluidly connected to a second nozzle and diffuser configured to entrain the recirculated flow and provide the inlet stream at low-load conditions.

16. The electric power generation system of claim 14, wherein the regulator is a pressure control valve for regulating the pressure of the first motive flow to the multiple jet ejector assembly.

17. The electric power generation system of claim 16, further comprising a pressure transducer for detecting the pressure of the first motive flow to the multiple jet ejector assembly and for assisting in the operation of the first, second and by-pass solenoid valves.

18. The electric power generation system of claim 14, wherein the multiple jet ejector assembly further comprises a third motive flow inlet fluidly connected to the pressurized reactant supply.

19. The electric power generation system of claim 18, wherein:
the first motive flow inlet is fluidly connected to a first nozzle and diffuser configured to entrain the recirculated flow and provide the inlet stream at high-load conditions;

the second motive flow inlet is fluidly connected to a second nozzle and diffuser configured to entrain the recirculated flow and provide the inlet stream at low-load conditions; and
the third motive flow inlet is fluidly connected to a third nozzle and diffuser configured to entrain a portion of the recirculated flow and provide a portion of the inlet stream at idle-load conditions.

20. A method of operating the electric power generation system of claim 14, comprising:
during low-load operating conditions, opening the second solenoid valve and closing the first and by-pass solenoid valves, so that the first motive flow is directed to the second motive flow inlet; and
during high-load operating conditions, closing the second solenoid valve and opening the first and by-pass solenoid valves, so that the first motive flow is directed to the first motive flow inlet and the second motive flow is directed to the second motive flow inlet.

21. A method of operating the electric power generation system of claim 18, comprising:
during low-load operating conditions, opening the second solenoid valve and closing the first and by-pass solenoid valves, so that the first motive flow is directed to the second motive flow inlet;
during high-load operating conditions, closing the second solenoid valve and opening the first and by-pass solenoid valves, so that the first motive flow is directed to the first motive flow inlet and the second motive flow is directed to the second motive flow inlet; and
during all operating conditions, directing a third motive flow from the pressurized reactant supply to the third motive flow inlet.

22. An electric power generation system comprising:
a fuel cell stack, comprising a first reactant stream inlet configured to receive a first inlet stream, a second reactant stream inlet configured to receive a second inlet stream, a first reactant stream outlet and at least one fuel cell;
a pressurized reactant supply;
a multiple jet ejector assembly, comprising:
  a suction inlet, fluidly connected to the first reactant stream outlet to receive a recirculated flow,
  a discharge outlet, fluidly connected to the first reactant stream inlet to provide the first inlet stream,
  a first motive flow inlet fluidly connected to the pressurized reactant supply, and
  a second motive flow inlet fluidly connected to the pressurized reactant supply;
a first pressure regulator, fluidly connected to, and interposed between, the pressurized reactant supply and the first motive flow inlet, for regulating the pressure of a first motive flow to the first motive flow inlet, wherein the first pressure regulator is configured to maintain the pressure of the first inlet stream, in relation to the pressure of the second inlet stream, at a substantially constant first pressure differential; and
a second pressure regulator, fluidly connected to, and interposed between, the pressurized reactant supply and the second motive flow inlet, for regulating the pressure of a second motive flow to the second motive flow inlet, wherein the second pressure regulator is configured to maintain the pressure of the first inlet stream, in relation to the pressure of the second inlet stream, at a substantially constant second pressure differential, wherein the first pressure differential is different from the second pressure differential.

23. The electric power generation system of claim 22, wherein:
the first motive flow inlet is fluidly connected to a first nozzle and diffuser configured to entrain the recirculated flow and provide the inlet stream at high-load conditions;
the second motive flow inlet is fluidly connected to a second nozzle and diffuser configured to entrain the recirculated flow and provide the inlet stream at low-load conditions; and
the first pressure differential is less than the second pressure differential.

* * * * *